United States Patent [19]

Miller et al.

[11] Patent Number: 4,504,634

[45] Date of Patent: Mar. 12, 1985

[54] COPOLYESTER-CARBONATE BLENDS EXHIBITING IMPROVED PROCESSABILITY

[75] Inventors: Kenneth F. Miller, Mt. Vernon; Edward Belfoure, New Harmony, both of Ind.

[73] Assignee: General Electric Company, Mt. Vernon, Ind.

[21] Appl. No.: 452,907

[22] Filed: Dec. 27, 1982

[51] Int. Cl.³ .................... C08L 67/02; C08L 69/00
[52] U.S. Cl. ................................ 525/439; 524/537; 525/466
[58] Field of Search ............................. 525/439, 466

[56] References Cited

U.S. PATENT DOCUMENTS

| | | | |
|---|---|---|---|
| 4,169,081 | 9/1979 | Borman | 525/439 |
| 4,226,961 | 10/1980 | Motz | 525/444 |
| 4,281,088 | 7/1981 | Kinson | 525/439 |
| 4,297,455 | 10/1981 | Linden | 525/439 |
| 4,436,879 | 3/1984 | Miller | 525/439 |

FOREIGN PATENT DOCUMENTS

| | | | |
|---|---|---|---|
| 55-133445 | 3/1979 | Japan | 525/439 |
| 55-131048 | 10/1980 | Japan | |

*Primary Examiner*—John C. Bleutge
*Assistant Examiner*—Patricia Short
*Attorney, Agent, or Firm*—Myron B. Kapustij; Martin B. Barancik

[57] ABSTRACT

Copolyester-carbonate blends exhibiting improved processability comprised of, in admixture:
(i) at least one copolyester-carbonate resin; and
(ii) a processability improving amount of at least one halogenated polycarbonate resin.

13 Claims, No Drawings

COPOLYESTER-CARBONATE BLENDS EXHIBITING IMPROVED PROCESSABILITY

BACKGROUND OF THE INVENTION

Copolyester-carbonate resins are known thermoplastic materials which, due to their many advantageous properties, find use as thermoplastic engineering materials in a wide variety of applications. The copolyester-carbonates exhibit, for example, excellent properties of toughness, flexibility, high heat distortion temperatures, and optical transparency. However, these resins, due to their relatively high melt viscosities, are generally relatively difficult to process. Various additives can be added to these resins in order to improve their processability. The addition of these additives, while generally being effective in improving the processability of the resins, sometimes adversely affects some of their other advantageous properties such as, for example, their heat distortion temperatures and their optical transparency. It would thus be very advantageous if copolyester-carbonates could be provided which were easier to process and simultaneously retained their high heat distortion temperatures and their optical transparency.

It is, therefore, an object of the instant invention to provide copolyester-carbonate resin compositions which are easier to process and which yet retain their relatively high heat distortion temperatures and their optical properties such as transparency.

SUMMARY OF THE INVENTION

In accordance with the instant invention there are provided copolyester-carbonate compositions which exhibit improved processability while at the same time retaining their relatively high heat distortion temperatures and their optical transparency.

The novel copolyester-carbonate compositions of this invention are comprised of blends of (i) at least one copolyester-carbonate resin, and (ii) a processability improving amount of at least one high molecular weight aromatic polycarbonate resin containing halogen substituents on at least some of the aromatic residues.

DESCRIPTION OF THE INVENTION

It has been discovered that copolyester-carbonate compositions can be obtained which exhibit improved processability while at the same time retaining their relatively high heat distortion temperatures and their optical properties such as transparency.

The instant blends are comprised of (i) at least one copolyester-carbonate resin, and (ii) a processability improving amount of at least one high molecular weight aromatic polycarbonate resin containing halogen substituents on at least some of the aromatic residues.

The copolyester-carbonates of the instant invention are known compounds which are described, inter alia, in U.S. Pat. Nos. 3,169,121; 3,030,331; 4,156,069, 4,238,596 and 4,238,597, all of which are incorporated herein by reference.

Briefly stated, the copolyester-carbonates of this invention comprise recurring carbonate groups $$(-O-\overset{O}{\underset{\|}{C}}-O-)$$

carboxylate groups $$(-\overset{O}{\underset{\|}{C}}-O-)$$

and aromatic carbocyclic groups in the linear polymer chain, in which at least some of the carboxylate groups and at least some of the carbonate groups are bonded directly to ring carbon atoms of the aromatic carbocyclic groups.

These copolyester-carbonate polymers contain ester and carbonate bonds in the polymer chain, wherein the amount of the ester bonds is in the range of from about 25 to about 90 mole percent, preferably in the range of from about 35 to about 80 mole percent. For example, 5 moles of bisphenol-A reacting completely with 4 moles of isophthaloyl dichloride and 1 mole of phosgene would give a copolyester-carbonate of 80 mole percent ester bonds.

The copolyester-carbonates are prepared by reacting, as essential reactants, a difunctional carboxylic acid or a reactive derivative thereof, a dihydric phenol, and a carbonate precursor.

The dihydric phenols useful in the preparation of the copolyester-carbonates are represented by the general formula

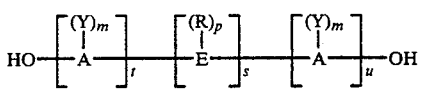

in which A is an aromatic group such as phenylene, biphenylene, naphthylene, anthrylene, etc. E may be an alkylene or alkylidene group such as methylene, ethylene, propylene, propylidene, isopropylidene, butylene, butylidene, isobutylidene, amylene, isoamylene, amylidene, isoamylidene, etc. Where E is an alkylene or alkylidene group, it may also consist of two or more alkylene or alkylidene groups connected by a non-alkylene or non-alkylidene group such as an aromatic linkage, a tertiary amino linkage, an ether linkage, a carbonyl linkage, a silicon-containing linkage, or by a sulfur-containing linkage such as sulfide, sulfoxide, sulfone, etc. In addition, E may be a cycloaliphatic group (e.g. cyclopentyl, cyclohexyl, cyclohexylidene, etc), a sulfur containing linkage, such as sulfide, sulfoxide or sulfone; an ether linkage; a carbonyl group; a tertiary nitrogen group; or a silicon-containing linkage such as silane or siloxy. R is selected from hydrogen or a monovalent hydrocarbon group such as alkyl (methyl, ethyl, propyl, etc.), aryl (phenyl, naphthyl, etc.), aralkyl (benzyl, ethylphenyl, etc.), alkaryl, or cycloaliphatic (cyclopentyl, cyclohexyl, cyclohexylidene, etc.). Y may be an inorganic atom such as chlorine, bromine, fluorine, etc.; an inorganic group such as the nitro group; a group such as R above; or an oxy group such as OR, it being only necessary that Y be inert to and unaffected by the reactants and the reaction conditions. The letter m is any whole number from and including zero through the number of positions on A available for substitution; p is any whole number from and including zero through the number of positions on E available from substitution; t is a whole number equal to at least one, s is either zero or one, and u is any whole number including zero.

In the dihydric phenol compound represented by Formula I above, when more than one Y substituent is present, they may be the same or different. The same is true for the R substituent. Where s is zero in Formula I and u is not zero, the aromatic rings are directly joined with no intervening alkylene or other bridge. The positions of the hydroxyl groups and Y on the aromatic nuclear residues can be varied in the ortho, meta, or para positions and the groupings can be in a vicinal, asymmetrical or symmetrical relationship, where two or more ring carbon atoms of the aromatic hydrocarbon residue are substituted with Y and hydroxyl group.

Examples of dihydric phenol compounds that may be employed in this invention, and which are represented by Formula I, include, but are not limited to:
2,2-bis-(4-hydroxyphenyl)-propane (bisphenol-A);
2,4'-dihydroxydiphenylmethane;
bis-(2-hydroxyphenyl)-methane;
bis-(4-hydroxyphenyl)-methane;
bis-(4-hydroxy-5-nitrophenyl)-methane;
bis-(4-hydroxy-2,6-dimethyl-3-methoxyphenyl)-methane;
1,1-bis-(4-hydroxyphenyl)-ethane;
1,2-bis-(4-hydroxyphenyl)-ethane;
1,1-bis-(4-hydroxy-2-chlorophenyl)-ethane;
1,1-bis-(2,5-dimethyl-4-hydroxyphenyl)-ethane;
1,3-bis-(3-methyl-4-hydroxyphenyl)-propane;
2,2-bis-(3-phenyl-4-hydroxyphenyl)-propane;
2,2-bis-(3-isopropyl-4-hydroxyphenyl)-propane;
bis-(4-hydroxyphenyl)-phenylmethane;
bis-(4-hydroxyphenyl)-cyclohehane; etc.

Other useful dihydric phenols are set forth in U.S. Pat. Nos. 3,169,121; 2,288,282; 3,148,172 and 2,739,171, all of which are incorporated herein by reference.

Preferred dihydric phenols, from the standpoint of providing copolyester-carbonates which are most useful in the practice of the instant invention, are those represented by the general formula

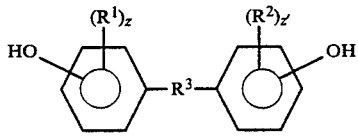

wherein:
each $R^1$ is independently selected from halogen, alkyl, aryl, aralkyl, and alkaryl radicals;
each $R^2$ is independently selected from halogen, alkyl, aryl, alkaryl, and aralkyl radicals;
$R^3$ is selected from alkylene, cycloalkylene, alkylidene, and cycloalkylidene radicals; and
z and z' are independently selected from whole numbers having a value of from 0 to 4 inclusive.

Preferred alkyl radicals represented by $R^1$ and $R^2$ are those containing from 1 to about 6 carbon atoms. Preferred aryl radicals represented by $R^1$ and $R^2$ are those containing 6 or 12 carbon atoms. Preferred alkaryl and aralkyl radicals represented by $R^1$ and $R^2$ are those containing from 7 to about 14 carbon atoms.

Preferred alkylene and alkylidene radicals represented by $R^3$ are those containing from 1 to about 6 carbon atoms. Preferred cycloalkylene and cycloalkylidene radicals represented by $R^3$ are those containing from 4 to about 12 carbon atoms.

In general, any difunctional carboxylic acid conventionally used in the preparation of linear polyesters may be utilized for the preparation of the copolyester-carbonates of the present invention. In general, the carboxylic acids which may be used include the aliphatic carboxylic acids, the aliphatic-aromatic carboxylic acids, and aromatic carboxylic acids. These acids are disclosed in U.S. Pat. No. 3,169,121, which is hereby incorporated herein by reference.

The carboxylic acids which may be utilized in the preparation of the copolyester-carbonates generally conform to the formula $$R^4—(R^5)_q—COOH \qquad \text{III.}$$

wherein $R^5$ is an alkylene, alkylidene, aralkylene, aralkylidene or cycloaliphatic group; an alkylene, alkylidene or cycloaliphatic group containing ethylenic unsaturation; an aromatic group such as phenylene, biphenylene, substituted phenylene, and the like; two or more aromatic groups connected through non-aromatic linkages such as alkylene or alkylidene groups; and the like. $R^4$ is either a carboxyl or a hydroxyl group. The letter q represents one where $R^4$ is a hydroxyl group and either zero or one where $R^4$ is a carboxyl group.

Preferred difunctional carboxylic acids are the aromatic carboxylic acids, i.e., those wherein q is one, $R^4$ is a carboxyl or a hydroxyl group, and $R^5$ is an aromatic group such as phenylene, biphenylene, naphthylene, substituted phenylene, and the like. The preferred aromatic carboxylic acids are those represented by the general formula

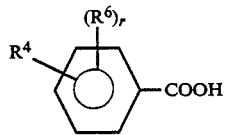

wherein $R^4$ is as defined above; r represents a whole number having a value of from 0 to 4 inclusive; and $R^6$ represents an inorganic atom such as a halogen, an organic group such as a monovalent hydrocarbon group such as alkyl, aryl, aralkyl, alkaryl, cycloaliphatic group; or an inorganic group such as the nitro group, etc. When more than one $R^6$ substituent is present, they may be the same or different.

Mixtures of these difunctional carboxylic acids can also be employed, and where the term difunctional carboxylic acid is used herein mixtures of such materials as well as individual difunctional carboxylic acids are considered to be included therein.

Preferred aromatic difunctional carboxylic acids are isophthalic acid, terephthalic acid, and mixtures thereof. A particularly useful mixture of isophathlic acid and terephthalic acid is one wherein the weight ratio of isophthalic acid and terephthalic acid is in the range of from about 1:10 to about 10:1.

Rather than utilizing the difunctional carboxylic acids per se it is possible, and sometimes even preferable, to employ their reactive derivatives. The preferred reactive derivatives of the difunctional carboxylic acids are the acid halides. Preferred acid halides are the acid chlorides, preferably the dichlorides. Thus, for example, instead of using terephthalic acid, isophthalic acid, or mixtures thereof, it is possible to utilize isophthaloyl dichloride, terephthaloyl dichloride, or mixtures of isophthaloyl dichloride and terephthaloyl dichloride.

The carbonate precursor employed in the preparation of the copolyester-carbonates of the instant invention can be a carbonyl halide, a diaryl carbonate, or a bishaloformate. The preferred carbonate precursors are the carbonyl halides. The carbonyl halides include carbonyl chloride, carbonyl bromide, and mixtures thereof. The preferred carbonyl halide is carbonyl chloride, also known as phosgene.

The polycarbonate that is admixed with the aforedescribed copolyester-carbonate resin to form the blends of the instant invention is a high molecular weight aromatic carbonate polymer containing halogen substituents on at least some of the aromatic nuclear residues. That is to say, containing at least one repeating structural unit represented by the general formula

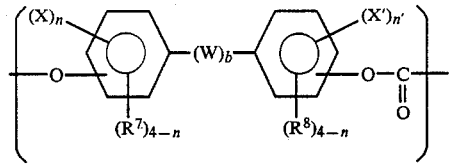
V.

wherein:
W is selected from divalent hydrocarbon radicals, —S—, —S—S—, —O—,

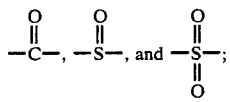

each $R^7$ is independently selected from hydrogen and monovalent hydrocarbon radicals;

each $R^8$ is independently selected from hydrogen and monovalent hydrocarbon radicals;

b is either one or zero;

n and n' are independently selected from whole numbers having a value of from 0 to 4 inclusive, with the proviso that the sum of n+n' is equal to from 2 to 8, inclusive, preferably from 3 to 6, and more preferably is 4;

each X is independently selected from halogen, preferably chlorine and bromine, more preferably bromine;

each X' is independently selected from halogen, preferably chlorine and bromine, more preferably bromine;

The divalent hydrocarbon radicals represented by W are selected from alkylene radicals, preferably those containing from 2 to about 6 carbon atoms; alkylidene radicals, preferably those containing from 1 to about 6 carbon atoms; cycloalkylidene and cycloalkylene radicals, preferably those containing from 4 to about 12 carbon atoms.

The monovalent hydrocarbon radicals represented by $R^7$ and $R^8$ are selected from alkyl radicals, preferably those containing from 1 to about 6 carbon atoms; aryl radicals, preferably those containing from 6 to 12 carbon atoms; and aralkyl and alkaryl radicals, preferably those containing from 7 to about 14 carbon atoms.

Preferred structural units of Formula V are those wherein W represents a divalent hydrocarbon radical, b is one, and X and X' are bromine radicals. More preferred structural units of Formula V are those wherein the sum of n+n' is equal to from 3 to 6. The most preferred structural units of Formula V are those wherein n+n' is equal to 4, with those units wherein both n and n' have a value of 2 being preferred. Of these most preferred structural units those derived from tetrabromobisphenol-A are particularly useful.

Rather than utilizing a polycarbonate which is comprised solely of repeating structural units V it is possible to utilize a polycarbonate comprised of repeating structural units of Formula V and repeating structural units represented by the general formula

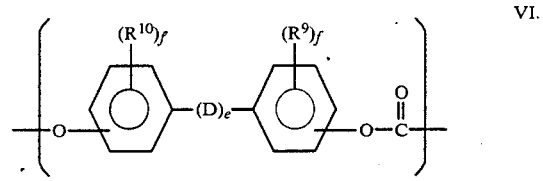
VI.

wherein:
each $R^9$ is independently selected from monovalent hydrocarbon radicals and monovalent hydrocarbonoxy radicals;

each $R^{10}$ is independently selected from monovalent hydrocarbon and monovalent hydrocarbonoxy radicals;

D is selected from divalent hydrocarbon radicals, —S—, —S—S—, —O—,

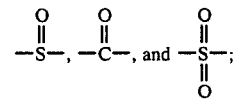

e is either one or zero; and f and f' are independently selected from whole numbers having a value from 0 to 4 inclusive.

The monovalent hydrocarbon radicals represented by $R^9$ and $R^{10}$ include the alkyl radicals, preferably those containing from 1 to about 6 carbon atoms; the aryl radicals, preferably those containing from 6–12 carbon atoms; the aralkyl radicals, preferably those containing from 7 to about 14 carbon atoms; and the alkaryl radicals, preferably those containing from 7 to about 14 carbon atoms.

The monovalent hydrocarbonoxy radicals represented by $R^9$ and $R^{10}$ include the alkoxy radicals, preferably those containing from 1 to about 6 carbon atoms; and the aryloxy radicals, preferably those containing from 6–12 carbon atoms.

The divalent hydrocarbon radicals represented by D include the alkylene radicals, preferably those containing from 2 to about 6 carbon atoms; the cycloalkylene radicals, prefereably those containing from 4 to about 12 carbon atoms; the alkylidene radicals, preferably those containing from 1 to about 6 carbon atoms; and the cycloalkylidene radicals, preferably those containing from 4 to about 12 carbon atoms.

If more than one $R^9$ substituent group is present they may be the same or different. The same holds true for the $R^{10}$ substituent groups. If e represents 0 the aromatic nuclear residues are directly joined without any intervening alkylene or other radical aforedescribed.

Preferred structural units of Formula VI are those wherein e is one and D represents a divalent hydrocarbon radical.

It is sometimes preferred, because of the relative ease of production and processability, to utilize polycarbonate resins which instead of containing only repeating structural units of Formula V also contain repeating structural units of Formula VI (herinafter referred to as resin "B" as opposed to polycarbonate resin comprised solely of repeating structural units of Formula V hereinafter referred to as resin "A").

It is critical to the present invention that the polycarbonate resin component of the instant blends contain at least one repeating structural unit of Formula V. It is further essential that this polycarbonate component contain an effective amount of said repeating structural unit of Formula V. If the polycarbonate component does not contain any of the recurring units of Formula V, i.e., if it contains only recurring structural units of Formula VI, the processability of the blends may be improved, i.e., the melt flow rate of the blends is increased, but only at the expense of the heat distortion temperatures thereof. That is to say, while the melt flow rate is increased the heat distortion temperature is decreased. Likewise, if the polycarbonate component of the blends contains an amount of repeating structural units of Formula V less than the effective amount (with the remainder of repeating structural units present being those represented by Formula VI) the processability of the blends is improved but only at the expense of their heat distortion temperatures. This effective amount, of course, only is applicable to the case wherein resin "B" is used as the polycarbonate component of the instant blends, since polycarbonate resin "A" contains solely repeating structural units of Formula V.

The effective amount of repeating structural units of Formula V that need be present is an amount effective to keep the heat distortion temperatures of the blends from being significantly adversely affected. Generally this amount is at least about 10 weight percent, based on the amount of structural units of Formulae V and VI present in the polycarbonate resin. It is preferred to utilize polycarbonate resins containing at least about 20 weight percent of recurring structural units of Formula V, preferably at least about 30 weight percent of said units, and more preferably at least about 40 weight percent of the recurring structural units of Formula V. There is no upper limit on the amount of the repeating structural units of Formula V that may be present in the carbonate polymer chain, and as pointed out hereinafore the polycarbonate may be comprised solely of repeating structural units of Formula V. However, it is generally preferred to utilize resins "B" because of their relative ease of processability as compared to resins "A". Generally, resins "B" will contain from about 10 to about 80 weight percent, preferably from about 30 to about 70 weight percent, and more preferably from about 40 to about 60 weight percent of the recurring structural units of Formula V, based on the amount of structural units of Formulae V and VI present.

The amount of the polycarbonate resin containing the requisite amounts of recurring structural units of Formula V, both resin "B" and resin "A", present in the instant copolyester-carbonate/polycarbonate blends is critical. If too little of the polycarbonate is present in the blend there is no appreciable improvement in the processability of the blend. If, on the other hand, too much of the polycarbonate is present there is improvement in the processability but only at the expense of the heat distortion temperatures of the blends. Thus, the amount of the polycarbonate resin of the instant invention, i.e., a polycarbonate resin containing at least 10 weight percent of recurring structural units of Formula V, present in the copolyester-carbonate/polycarbonate blends is an amount effective to improve the processability of the blends but insufficient to significantly deleteriously affect the heat distortion temperatures of the blends. Generally this amount is in the range of from about 1 to about 70 weight percent, based on the amount of copolyester-carbonate and polycarbonate present, preferably from about 2 to about 60 weight percent. In general, if the amount of the polycarbonate resin present is less than about 1 weight percent there is no appreciable improvement in the processability of the blends. If, on the other hand, the blends contain more than about 70 weight percent of the polycarbonate, the heat distortion temperatures of the blends are significantly adversely affected.

The instant polycarbonates are derived from the appropriate dihydric phenol and a carbonate precursor. The polycarbonates containing structural units of Formula V in the polymer chain are obtained by coreacting a carbonate precursor with a dihydric phenol represented by the general formula

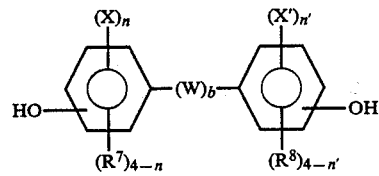

wherein $R^7$, $R^8$, X, X', W, b, n and n' are as defined hereinafore.

These dihydric phenols are well known in the art. Some non-limiting illustrative examples of these dihydric phenol include:
2,2-bis(3,5-dibromo-4-hydroxyphenyl)propane;
2,2-bis(3-bromo-5-methyl-4-hydroxyphenyl)propane;
2,2-bis(2,3,5,6-tetrabromo-4-hydroxyphenyl)propane;
1,1-bis(3,5-dichloro-4-hydroxyphenyl)cyclohexane;
1,1-bis(3-chloro-5-bromo-4-hydroxyphenyl)butane;
2,2-bis(2,3,5-tribromo-4-hydroxyphenyl)propane;
1,4-(3,5-dibromo-4,4'-dihydroxydiphenyl)butane; and the like.

In the dihydric phenols of Formula VII when more than one X substituent is present they may be the same or different. The same holds true for the X', $R^7$, and $R^8$ substituents.

The polycarbonate resins "B" are obtained by coreacting (i) a carbonate precursor, (ii) at least one dihydric phenol of Formula VII, and (iii) at least one dihydric phenol represented by the general formula

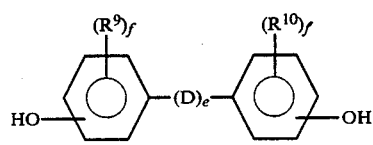

wherein $R^9$, $R^{10}$, D, f, f', and e are as defined above. These dihydric phenols are well known in the art and are disclosed, inter alia, in U.S. Pat. Nos. 3,028,365; 2,999,835; 3,030,331 and 3,169,121, all of which are hereby incorporated herein by reference. Some nonlimiting illustrative examples of these dihydric phenols include:
2,2-(4,4'-dihydroxydiphenyl)propane;
1,1-(4,4'-dihydroxydiphenyl)cyclohexane;
1,1-(2,2'-dihydroxy-4,4'-dimethyl-diphenyl)butane;
2,2-(4,4'-dihydroxydiphenyl)hexane;
2,2-(3,5,3',5'-tetramethyl-4,4'-dihydroxydiphenyl)propane;
2,2-(3,3'-diethyl-4,4'-dihydroxydiphenyl)propane;

2,2-(3-methyl-3'-isopropyl-4,4'-dihydroxydiphenyl)-butane;

1,4-(4,4'-dihydroxydiphenyl)butane; and the like.

In the dihydric phenols of Formula IX when more than one $R^9$ substituent is present they may be the same or different. The same is true for the $R^{10}$ substituents. In formulating polycarbonate resins "B" an individual dihydric phenol of Formula IX may be employed or a mixture of two or more dihydric phenols of Formula IX may be utilized. The same is true for the dihydric phenols of Formula VII. Furthermore, in order that the polycarbonate resins "B" contain the requisite minimum amount of repeating structural units of Formula V the amount of the dihydric phenol of Formula VII that is coreacted with the dihydric phenol of Formula IX and the carbonate precursor should be at least about 10 weight percent, based on the total amount of the dihydric phenols of Formulae VII and IX utilized.

Also contemplated as being within the scope of the instant invention are blends of high molecular weight aromatic polycarbonates. These blends are comprised of (i) at least one polycarbonate resin derived from (a) a carbonate precursor, and (b) at least one dihydric phenol of Formula VII; and (ii) at least one polycarbonate resin derived from (a) a carbonate precursor, and (b) at least one dihydric phenol of Formula IX. These polycarbonate blends contain an amount of polycarbonate resin (i) effective to keep the heat distortion temperatures of the instant copolyestercarbonate/polycarbonate blends from being significantly adversely affected. Generally, this amount is at least about 10 weight percent, based on the amount of polycarbonate resins (i) and (ii) present in the polycarbonate blends, preferably at least about 30 weight percent, and more preferably at least about 40 weight percent. The amount of these polycarbonate blends present in the copolyester-carbonate/polycarbonate blends of the instant invention is an amount effective to to improve the processability of the instant copolyester-carbonate/polycarbonate blends but insufficient to significantly deleteriously affect the heat distortion temperatures of the instant blends. Generally, this amount is in the range of from about 1 to about 70 weight percent, based on the amount of the copolyester-carbonate resin and the polycarbonate resin blends present in the instant copolyester-carbonate/polycarbonate blends, prefereably from about 2 to about 60 weight percent.

The instant blends are prepared by physically admixing at least one copolyester-carbonate resin with at least one of the instant polycarbonate resins. The instant blends may optionally contain the commonly known and used additives such as antioxidants; antistatic agents; fillers such as glass fibers, talc, mica, clay, and the like; impact modifiers; ultraviolet radiation absorbers such as the benzophenones, benzotriazoles, and the like; hydrolytic stabilizers such as the epoxides disclosed in U.S. Pat. Nos. 3,489,716; 4,138,379, and 3,839,247, all of which are incorporated herein by reference; color stabilizers such as the organophosphites; flame retardants; and the like.

Some particularly useful flame retardants are the alkali and alkaline earth metal salts of sulfonic acids. These types of flame retardants are disclosed in U.S. Pat. Nos. 3,933,734; 3,931,100; 3,978,024; 3,948,851; 3,926,908; 3,919,167; 3,909,490; 3,953,396; 3,953,399; 3,917,559; 3,951,910, and 3,940,366, all of which are incorporated herein by reference.

DESCRIPTION OF THE PREFERRED EMBODIMENT

The following examples are set forth to further illustrate the present invention and are not to be considered as limiting the invention thereto. Unless otherwise specified, where parts or percentages are mentioned, they are parts or percents by weight.

PREPARATION A—COPOLYESTER-CARBONATE RESIN

To a reactor vessel fitted with a mechanical agitator are charged 10 liters of deionized water, 16 liters of methylene chloride, 1,910 grams (8.36 moles) of bisphenol-A, 24 milliliters of triethylamine, 3.4 grams of sodium gluconate and 65 grams (0.43 mole) of para-tertiarybutyl phenol. This reaction mixture is stirred and to the stirred reaction mixture are added over a 15 minute period a mixture of 926 grams of terephthaloyl dichloride and 163 grams of isophthaloyl dichloride as a 25 weight % solids solution in methylene chloride. During the acid chloride addition the pH is maintained in the range of 8.5–11.5 by the addition of a 25% aqueous sodium hydroxide solution. The resulting mixture is phosgenated by the introduction of phosgene at the rate of 36 grams per minute for 15 minutes with the pH controlled at 9.5 to 12 by the addition of aqueous sodium hydroxide. After phosgenation is terminated, 6 liters of methylene chloride are added, the brine layer is separated by centrifuge and the resin solution is washed with aqueous acid and thrice with water. The resin is then steam precipitated and dried in a nitrogen fluid bed drier at approximately 240° F. This resin product is then fed to an extruder operating at a temperature of about 600° F. to extrude the resin into strands and the extruded strands are chopped into pellets. The pellets are then injection molded from about 620° F.–650° F. into test samples measuring about 2½"×½"×⅛". The heat distortion temperature under load (DTUL) of these samples is determined according to modified ASTM D-648.

Also determined for the copolyester-carbonate resin in the Kasha Index (KI) which is an indication or measure of the processability of the resin, i.e., the lower the KI the greater the melt flow rate and, therefore, the better the processability. Basically, the Kasha Index is a measurement of the melt viscosity of the resin. The procedure for determining the Kasha Index is as follows: 7 grams of resin pellets, dried a minimum of 90 minutes at 125° C., are added to a modified Tinius-Olsen T3 melt indexer; the temperature in the indexer is maintained at 300° C. and the resin is heated at this temperature for 6 minutes; after 6 minutes the resin is forced through a 0.04125 inch radius orifice using a plunger of radius of 0.1865 inch and an applied force of 17.7 pounds; the time required for the plunger to travel 2 inches is measured in centiseconds and this is reported as the KI. The higher the KI, the higher the melt viscosity and the more viscous the resin, and, therefore, the more difficult to process.

The results of these tests are set forth in Table I.

PREPARATION B—HALOGENATED POLYCARBONATE RESIN

This is a preparation of a polycarbonate resin of the instant invention which contains approximately 48 weight percent of the repeating structural units of Formula V, and approximately 52 weight percent of repeating structural units of Formula VI, with the units of Formula V containing 4 bromine substituents on the aromatic residues, i.e., 2 bromine atoms per each aromatic ring.

To a reaction vessel are added 44 liters of water, 40 liters of methylene chloride, 7.4 kilograms of bisphenol-A, 7.4 kilograms of 2,2-bis(3,5-dibromo-4-hydroxyphenyl)propane, 250 grams of triethylamine, 150 grams of phenol, and 13 grams of sodium gluconate. With stirring the pH is raised to 11 by the addition of aqueous sodium hydroxide. 6.8 kilograms of phosgene are introduced into the reaction vessel with the pH maintained at about 11. At the end of the reaction the brine layer is separated from the resin layer, then washed with water, aqueous HCl, and 3 more water washings. The resin is then steam precipitated. The IV (intrinsic viscosity) of the resin as measured in methylene chloride at 25° C. is found to be 0.34 dl/gm.

EXAMPLES 2-9

Various blends of the copolyester-carbonate resin of preparation A and the halogenated polycarbonate resin of preparation B are prepared by admixing the two resins together in varying amounts. These blends are then formed into test samples as described for preparation A hereinafore. The blends and the test samples are then tested for the heat distortion temperature under load and for the Kasha Index and the results are set forth in Table I.

TABLE I

| Example No. | wt. % of polycarbonate of preparation B | DTUL°C. (264 psi) | KI |
|---|---|---|---|
| Control (Prep. A)* | 0 | 161.6 | 42,630 |
| 2* | 2 | 162.1 | 38,452 |
| 3* | 5 | 160.6 | 40,430 |
| 4* | 10 | 163.1 | 37,030 |
| 5** | 20 | 161.5 | 23,950 |
| 6** | 40 | 161.7 | 20,960 |
| 7** | 60 | 162.4 | 14,160 |
| 8** | 80 | 157.0 | 9,490 |
| 9** | 100 | 156.9 | 6,400 |

*Prep. A and Examples 2-5 all contain 0.03 phr of an organophosphite, 0.1 phr of an epoxide, and 50 ppm of an aromatic sulfonic acid salt.
**Examples 6-9 all contain 0.03 phr of an organophosphite, 0.1 phr of an epoxide, and 0.2 phr of a silicone fluid.

As shown by the data in Table I the heat distortion temperatures of Examples 2-7, which contain from 2 to 60 weight percent of the halogenated polycarbonate of preparation B and from 98 to 40 weight percent of the copolyester-carbonate resin of preparation A, are substantially equivalent to the heat distortion temperatures of the copolyester-carbonate resin alone, the Control. However, there is a significant decrease in the KI of the blends of Examples 2-7 relative to the KI of the Control. Thus, the blends of Examples 2-7 exhibit an improvement in processability while at the same time retaining substantially the same heat distortion temperatures as the unblended copolyester-carbonate resin.

However, in Example 8, which falls outside the scope of the instant invention by virtue of the fact that the amount of polycarbonate present in the blends is more than the specified critical amount, while there is a further improvement in processability, i.e., a further decrease in KI, there is also a significant decrease in the heat distortion temperature of the blend.

Example 9 contains only the halogenated polycarbonate resin of preparation B. This example is included to show the KI and heat distortion temperatures of the tetrabromo polycarbonate of preparation B.

This data clearly shows that an improvement in processability, while at the same time retaining the heat distortion temperature, of blends comprised of halogenated polycarbonate resin and copolyester-carbonate resins is present only over certain critical ranges of copolyester-carbonate to halogenated polycarbonate resins.

The following preparation and examples fall outside the scope of the instant invention in that the polycarbonate resin utilized in the copolyester-carbonate/polycarbonate blends does not contain any structural units of Formula V. These examples are presented to illustrate the criticallity of the presence of structural units of Formula V in the polycarbonate component in maintaining the high heat distortion temperatures of the blends.

PREPARATION C—NON-HALOGENATED POLYCARBONATE RESIN

This is a preparation of a polycarbonate resin falling outside the scope of the instant invention in that the polycarbonate resin contains no repeating structural units of Formula V.

To a reaction vessel are added 40 liters of water, 40 liters of methylene chloride, 15.9 kilograms of bisphenol-A, 256 grams of phenol, 80 grams of triethylamine, and 13 grams of sodium gluconate. With stirring the pH is raised to 10 by the addition of aqueous sodium hydroxide. 8 kilograms of phosgene are introduced into the reaction vessel with the pH maintained at about 11. At the end of the reaction the brine layer is separated from the resin layer, then washed with water, aqueous HCl, and three more washings with water. The resin is then steam precipitated. The IV of the resin as measured in methylene chloride at 25° C. is found to be 0.48 dl/gm.

EXAMPLES 10-12

Various blends of the copolyester-carbonate resin of preparation A and the non-halogenated polycarbonate resin of preparation C are prepared by admixing the two resins together in varying amounts. These blends are then formed into test samples substantially in accordance with the method described in preparation A. The heat distortion temperatures under load of the test samples and the Kasha Index of the blends are determined and the results are set forth in Table II.

TABLE II

| Example No. | wt. % of polycarbonate of preparation C | DTUL °C. (264 psi) | KI |
|---|---|---|---|
| 10* | 10 | 158.9 | 30,545 |
| 11* | 20 | 151.8 | 22,130 |
| 12* | 30 | 147.7 | 16,100 |

As illustrated by the data in Table II, the KI of the blends decreases, but the DTUL also decreases to a significant degree. This is in sharp contrast to the blends of the instant invention as illustrated by Examples 2-7 in Table I wherein the DTUL remains steady while the KI decreases. This clearly illustrates the criticality of utilizing halogenated polycarbonate resins in order to produce copolyester-carbonate/polycarbonate resin blends which exhibit improved processability while retaining high heat distortion temperatures.

The presence of the halogenated polycarbonate resin in the instant blends generally tends to have a somewhat deleterious affect on the impact strength, particularly the thick section impact strength, of these blends. However, for many applications the impact strength of the instant blends is quite sufficient, and whatever loss of impact strength that there is, is more than offset by the improvement in processability of these blends.

Although the above examples and disclosure have shown various modifications of the present invention, other variations are possible in light of the above teachings. It is, therefore, to be understood that changes may be made in the particular embodiments of the invention described which are within the full intended scope of the invention as defined by the appended claims.

What is claimed is:

1. Copolyester-carbonate blends exhibiting improved processability consisting essentially of, in physical admixture:
   (i) at least one high molecular weight aromatic copolyester-carbonate resin containing carbonate bonds and ester bonds wherein said ester bonds are present in from about 25 to about 90 mole percent derived from (a) a carbonate precursor, (b) at least one dihydric phenol, and (c) at least one difunctional carboxylic acid or a reactive derivative thereof; and
   (ii) an amount effective to improve the processability of said blends but insufficient to significantly deleteriously affect the heat distortion temperature thereof, said amount being from about 2 to about 60 weight percent, based on the total amount of copolyester-carbonate resin and halogenated polycarbonate resin present, of at least one halogenated high molecular weight aromatic polycarbonate resin containing from about 10 to about 80 weight percent of at least one repeating structural unit represented by the general formula

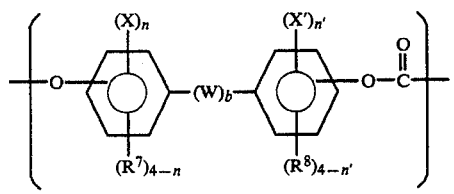

and from about 20 to about 90 weight percent of at least one repeating structural unit represented by the general formula

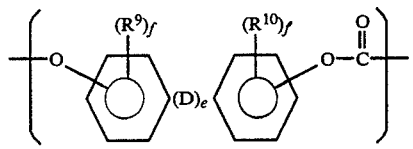

wherein
W is selected from alkylene, cycloalkylene, alkylidene, cycloalkylidene, —S—, —S—S—, —O—,

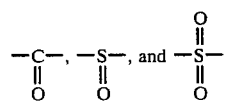

radicals each $R^7$ is independently selected from hydrogen and monovalent hydrocarbon radicals, each $R^8$ is independently selected from hydrogen and monovalent hydrocarbon radicals, each X is independently selected from halogen radicals, each X' is independently selected from halogen radicals, b is either zero or one, n and n' are independently selected from whole numbers having a value of from 0 to 4 inclusive, with the proviso that the sum of n+n' is equal to from 2-8, D is selected from divalent hydrocarbon radicals, —S—, —S—S—, —O—,

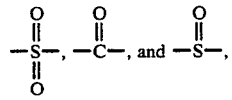

each $R^9$ is independently selected from monovalent hydrocarbon radicals and monovalent hydrocarbonoxy radicals, each $R^{10}$ is independently selected from monovalent hydrocarbon radicals and monovalent hydrocarbonoxy radicals, e is either zero or one, and f and f' are independently selected from whole numbers having a value of from 0 to 4 inclusive.

2. The blends of claim 1 wherein said halogen radicals are selected from chlorine and bromine.

3. The blends of claim 2 wherein said halogen radicals are selected from bromine radicals.

4. The blends of claim 2 wherein the sum of n+n' is equal to from 3 to 6.

5. The blends of claim 1 wherein said monovalent hydrocarbon radicals are selected from alkyl, aryl, aralkyl, and alkaryl radicals.

6. The blends of claim 5 wherein b is one and W is selected from divalent hydrocarbon radicals.

7. The blends of claim 6 wherein the sum of n+n' is equal to from 3 to 6.

8. The blends of claim 7 wherein n is 2, n' is 2, W is selected from alkylidene radicals, and X and X' are bromine.

9. The blends of claim 8 wherein $R^7$ and $R^8$ are hydrogen, and said alkylidene radical is 2,2-propylidene.

10. The blends of claim 1 wherein said monovalent hydrocarbon radicals represented by $R^9$ and $R^{10}$ are selected from alkyl, aryl, aralkyl, and alkaryl radicals.

11. The blends of claim 1 wherein said monovalent hydrocarbonoxy radicals represented by $R^9$ and $R^{10}$ are selected from alkoxy and aryloxy radicals.

12. The blends of claim 1 wherein e is one and D is selected from divalent hydrocarbon radicals.

13. The blends of claim 12 wherein said high molecular weight aromatic polycarbonate resins contain repeating structural units represented by the following general formulae:

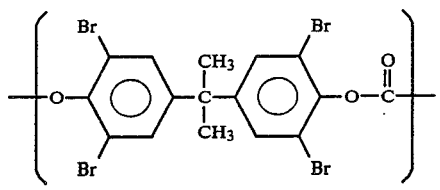
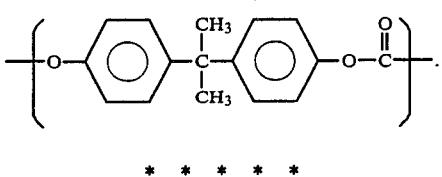
and
* * * * *

UNITED STATES PATENT AND TRADEMARK OFFICE
CERTIFICATE OF CORRECTION

PATENT NO. : 4,504,634
DATED : March 12, 1985
INVENTOR(S) : Kenneth F. Miller and Edward L. Belfoure It is certified that error appears in the above-identified patent and that said Letters Patent is hereby corrected as shown below:

Column 12, after Table II, notes missing. Immediately after Table II should read "*Example 10-12 all contain 0.03 phr of an organophosphite, 0.1 phr of an epoxide, and 50 ppm of an aromatic sulfonic acid salt".

Signed and Sealed this
First Day of March, 1988

Attest:

DONALD J. QUIGG

Attesting Officer

Commissioner of Patents and Trademarks